May 6, 1969
J. L. McGILL
3,443,221
MULTIPLE-DECADE IMPEDANCE ARRANGEMENT WITH
ASSOCIATED DIAL MEANS FOR DIRECT READOUT
Filed Jan. 30, 1967
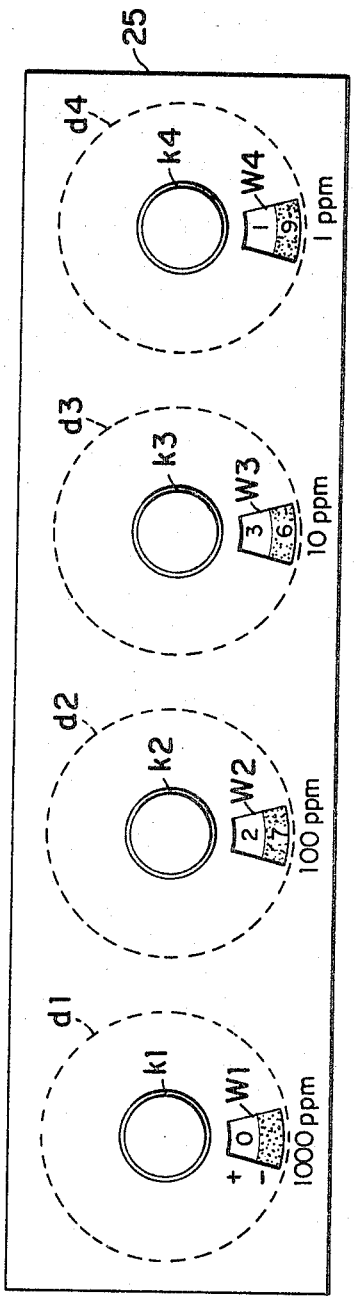
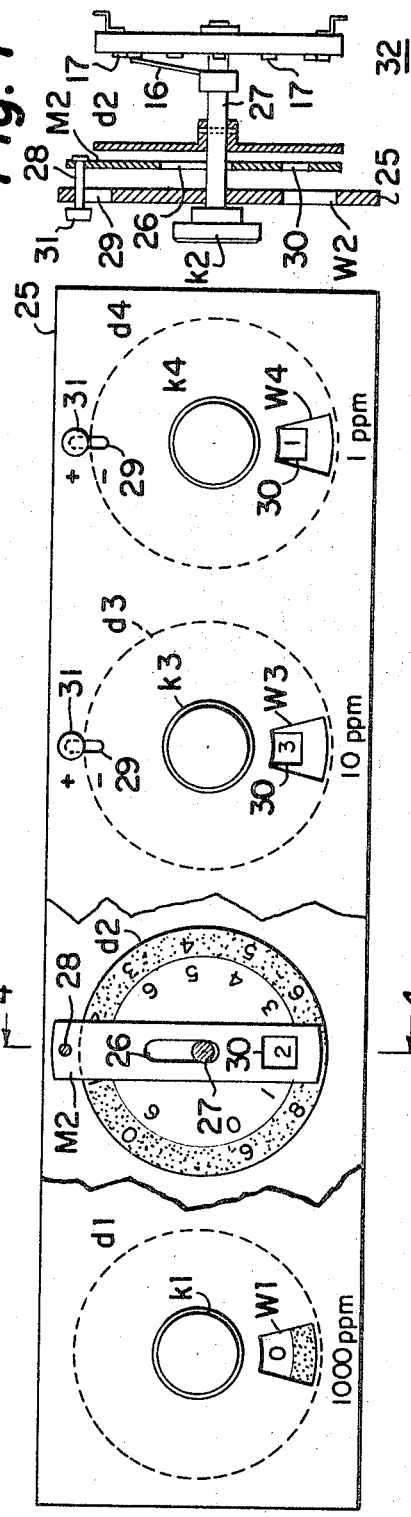

May 6, 1969

J. L. McGILL 3,443,221

MULTIPLE-DECADE IMPEDANCE ARRANGEMENT WITH
ASSOCIATED DIAL MEANS FOR DIRECT READOUT

Filed Jan. 30, 1967

Sheet _3_ of 3

United States Patent Office 3,443,221
Patented May 6, 1969

3,443,221
**MULTIPLE-DECADE IMPEDANCE ARRANGE-
MENT WITH ASSOCIATED DIAL MEANS
FOR DIRECT READOUT**
Joseph L. McGill, Philadelphia, Pa., assignor to Leeds
& Northrup Company, Philadelphia, Pa., a corporation
of Pennsylvania
Filed Jan. 30, 1967, Ser. No. 612,637
Int. Cl. G01r 27/02
U.S. Cl. 324—63                                    11 Claims

ABSTRACT OF THE DISCLOSURE

The accompanying disclosure is of a balanceable bridge circuit in which one of the ratio arms is adjustable above and below a reference value by two or more decade-resistance means having associated dials for direct readout therefrom of the difference between the adjusted resistance value and said reference value.

BACKGROUND OF THE INVENTION

This invention relates to decade-impedance arrangements such as used in balanceable bridge circuits. With prior-decade arrangements (see National Bureau of Standards Circular 470 and National Bureau of Standards Monograph 39), the readout of the decade dials at balance of the bridge is used in computations to determine the difference, in magnitude and sign, between an uncalibrated resistance and a standard resistance. Such computations are a source of error and are time-consuming.

SUMMARY OF INVENTION

In accordance with the present invention, the decade dials are so marked and the relationship between the decade impedances and an associated fixed impedance is so chosen that the difference between the uncalibrated and standard impedances, in percent and/or parts per decimal value, is directly readable in magnitude and sign from the decade-dial settings.

More specifically, each of the decade dials is marked with two series, or rows, of successive digits, each series beginning with 0 and progressively increasing in direction opposite to that of the other series of digits of the same dial. On the dial of the highest order, or first decade, there is no overlap of the two series of digit markings, so that only one readout is possible. Such unambiguous readout is of both the magnitude and sign of the highest order digit. On the subsequent decade dials, there is overlap of the two series of digits, but the proper one of the two possible readouts is keyed to the unambiguous readout of the first-decade dial. Such keying may be by positive or negative markings, or color: in a preferred form of the invention, the first-decade dial is mechanically linked to shutter arrangements for the subsequent decade dials, so that when the first dial is set to any positive digit +0 et seq., only positive digits of the subsequent decade dials are exposed for readout, and vice versa.

More specifically and for decade resistance arrangements, the effective series-resistance of the combination of decades and a fixed series-resistance is equal to a reference value corresponding with the standard resistance when all decade dials are set to +0; such +0 setting corresponding with the minimum resistance value of the second and subsequent decades and with a preselected intermediate value of the first decade.

The invention further resides in features of combination and arrangement hereinafter described and claimed.

For a more detailed understanding of the invention, reference is made to the following description and to the accompanying drawings.

BRIEF DESCRIPTION OF DRAWINGS

FIG. 2 is a front panel view of the dial arrangement of FIG. 1;

FIG. 3, in part broken away, is similar to FIG. 2 but additionally discloses masking means for the second order and subsequent decade dials;

FIG. 4 is a side sectional view taken on line 4—4 of FIG. 3;

DESCRIPTION OF PREFERRED EMBODIMENTS

Figure 1:
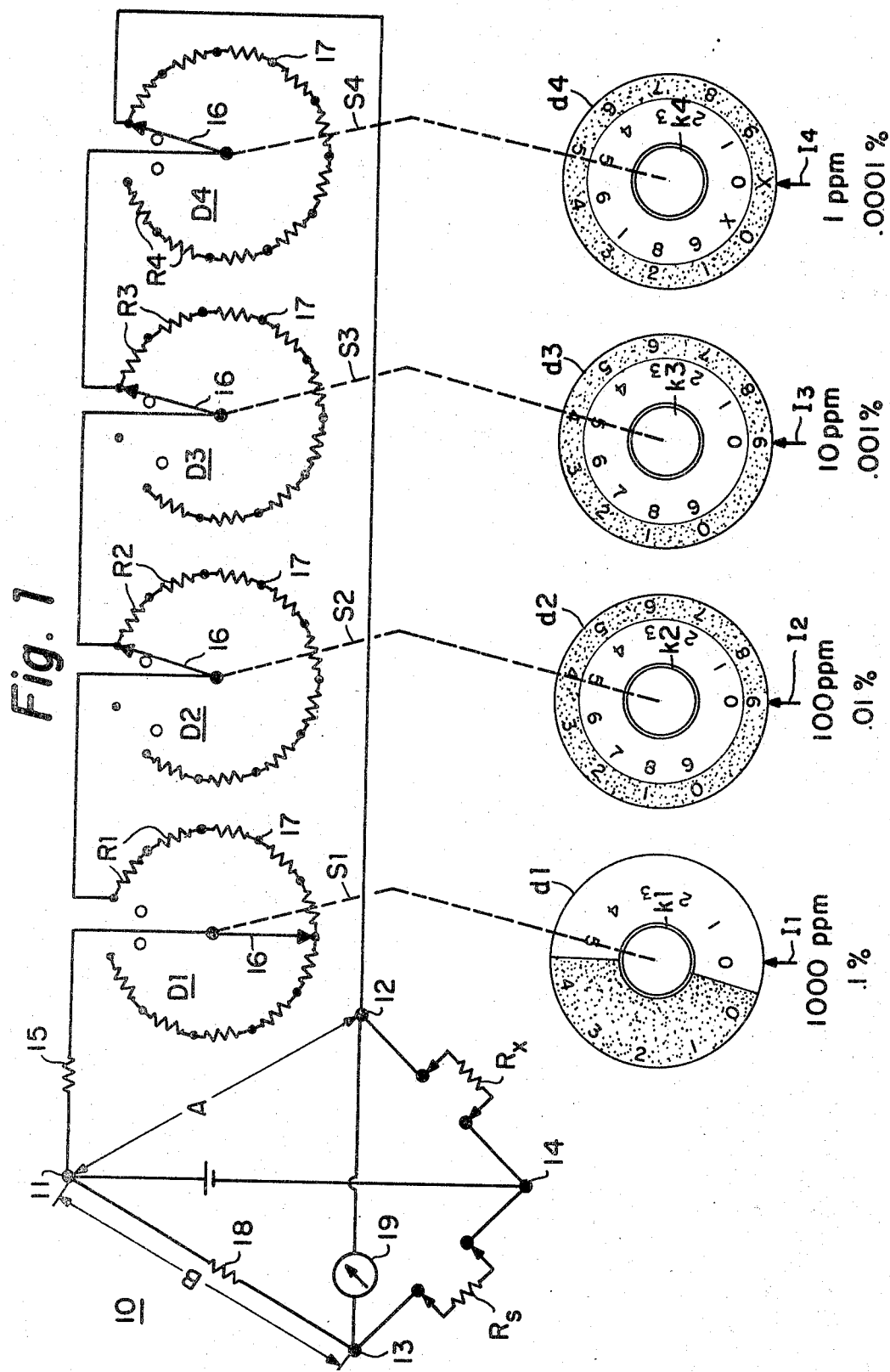
FIG. 1 schematically illustrates a Wheatstone bridge having one arm adjustable step-by-step by decade resistors whose dials provide a direct readout without computation.

In FIG. 1, a direct-reading ratio set embodying the present invention is shown incorporated in a Wheatstone bridge 10 to form the A and B ratio arms thereof. Specifically, the A-arm between terminals 11, 12 comprises a fixed resistance means 15 in series with four resistance-decades D1–D4, each including a multi-point switch 16 for step-by-step adjustment of the effective total resistance value of the associated decade.

The resistors R1 of the first decade D1 are of value chosen to effect a 0.1% change in the effective resistance of arm A as adjustable contact of switch S1 is moved from any one of fixed contacts 17 to the next. The dial $d1$, coupled to the adjustable contact 16 of the first decade switch S1, is marked with two series of successive digits which progressively increase in opposite directions from their respective 0's. As shown in FIG. 1, with contact 16 of the first decade D1 in its intermediate or mid-range setting, the +0 mark of dial $d1$ is in line with the first-decade index exemplified by arrow I1. For clockwise stepping of contact 16 from the position shown, the corresponding readings of dial $d1$ are 1,2 et seq., each step corresponding with an increase of 0.1% in the effective resistance of the A-arm. Conversely, for counterclockwise stepping of contact 16 from its indicated position, the corresponding indications of dial $d1$ are —0, —1 et seq., each step corresponding with a decrease of 0.1% in the effective resistance of the A-arm. For the indicated range of the first decade from +0.5% to —0.4%, the switch S1 has 11 positions, affording 10 equal changes in resistance of arm A.

The resistors R2 of the second decade D2 are of value chosen to effect a 0.01% change in the effective total resistance of arm A as adjustable contact of switch S2 is stepped from any one of fixed contacts 17 to the next. The dial $d2$ coupled to the adjustable contact 16 of switch S2 is marked with two superposed rows of successive digits progressively increasing in opposite directions. As shown in FIG. 1, with contact 16 of the second decade D2 in its No. 1 end position, both the 0 of the clockwise ascending series of digits and 9 of the clockwise descending series of digits are in line with the second decade index exemplified by arrow I2. For clockwise stepping of switch S2 from its indicated position, the successive corresponding pairs of markings of dial $d2$ are 1, 8; 2, 7; 3, 6; et seq., each clockwise step corresponding with an increase of 0.01% in the effective resistance of the A-arm. As later explained, which of the two rows of digits of dial $d2$ is used for reading depends upon the concurrent position of dial $d1$. Preferably and as shown, the switch S2 of the second-decade D2 has 10 active positions, affording 9 equal changes in resistance of ratio arm A.

The resistors R3 of the third decade D3 are of value chosen to effect a 0.001% change in the effective resistance of arm A as adjustable contact 16 of switch S3 is moved from one to the next fixed contact 17. The dial $d3$, coupled to adjustable contact 16 of switch S3, is also marked with two superposed rows of successive digits progressively increasing from 0 in opposite directions. As shown in FIG. 1, with contact 16 of the third decade D3 in its No. 1 end position, both the 0 of the inner row of digits and the 9 of the outer row of digits are in line with index means exemplified by arrow I3. For clockwise stepping of switch S3 from its indicated position, the successive corresponding pairs of markings of dial $d3$ are 1, 8; 2, 7; 3, 6; et seq., each clockwise step corresponding with an increase of 0.001% in the effective resistance of the A-arm. Which of the two rows of digits is used for reading of dial $d3$ depends, as later explained, upon the concurrent reading of dial $d1$. Preferably and as shown, the switch S3 of the third-decade D3 has 10 active switch positions, affording 9 equal changes in resistance of ratio arm A.

The resistors R4 of the fourth decade D4 are of value chosen to effect a 0.0001% change in the effective resistance of arm A as switch S4 is moved one step. The dial $d4$, coupled to adjustable contact of switch S4, is marked with two superposed rows of successive digits progressively increasing in opposite directions. With contact 16 of switch S4 in its No. 1 end position, the 0, of the clockwise increasing series of digits and the X (roman 10) of the clockwise decreasing series of digits are in line with index means exemplified by the arrow I4. For clockwise stepping of switch S4 from its indicated position, the corresponding successive paired indications of dial $d4$ are 1, 9; 2, 8; 3, 7, et seq. For this preferred marking of the last-decade dial, the switch S4 has 11 active positions, affording 10 equal steps of change of resistance of ratio arm A.

The values of the resistance 18 of the fixed resistance arm B and the fixed resistance 15 of arm A plus the associated decade resistances are so chosen that with all in their indicated position, the resistance of arm A is equal to the resistance of arm B. Table A below gives a specific example of these resistance values when the arm A is to be adjusted over a range of +0.5% to −0.5% about a reference value of 1,000 ohms with a direct readout to four decimal places. In this example, the decades are of the unshunted type shown in FIG. 1.

Table A

| Resistance: | Ohms |
|---|---|
| 15 | 995 |
| R1 | 1 |
| R2 | 0.1 |
| R3 | 0.01 |
| R4 | 0.001 |

At balance of bridge 10, as indicated by null response of detector 19, the difference between the known or standard resistance $R_S$ and the unknown or uncalibrated resistance $R_X$ can be read directly from the settings of dials $d1$–$d4$, either in parts-per-million or in percent in steps of 0.0001%. For direct readout of such difference in terms of parts-per-million, multipliers for the readings of dials $d1$–$d4$ are respectively 1,000, 100, 10 and 1; for direct readout of such difference in terms of percent, the multipliers for the readings of dials $d1$–$d4$ are respectively 0.1, 0.01, 0.001, and 0.0001. In either case, the algebraic sign of such difference is determinable from the setting of the first-decade dial $d1$. The difference is of negative sign if bridge balance is obtained with dial $d1$ set to any of the series of left-hand digits, beginning with −0, and is of positive sign if bridge balance is obtained with dial $d1$ set to any of the other series of digits, beginning with +0. It is to be noted that the +0 and −0 are not for the same settings of the dial. In either case, the indication of dial $d1$ is the numerical value of the highest digit of the difference, and such indication is unambiguous since there is no overlap of the two series of digits as presented to the index means. As to the remaining dials $d2$, et seq. having paired indications because of the overlapping rows of digits, the outer or lower row digit should be read when the numerical reading of dial $d1$, at balance, has a negative value. Conversely, if the reading of dial $d1$ has a positive value, the inner or upper row digit of the other dials should be read. For example, if at balance of the bridge the paired indications of dials $d2$–$d4$ are respectively 2, 7; 3, 6 and 1, 9, the correct readout for these dials is 2, 3, 1 for any setting of dial $d1$ in the series of its markings which begin with −0, whereas for any setting of dial $d1$ in the other series of its markings, beginning with +0, the correct readout for dials $d2$–$d4$ is 7, 6, 9.

Various ways may be used to key the reading of the first-decade dial $d1$ to the proper readout of the other decade dials. For example, the positive digits, or their background, of all dials may be of the same color, such as white, whereas the negative digits, or their background, may be of different color, such as red or black. Thus, if the readout of dial $d1$, at balance, is a white digit, then the proper readout of dials $d2$, et seq. is also of the white digits. In FIG. 1, the negative digits are shown as having a shaded background.

Preferably and as shown in FIGS. 2 and 3, the decade dials are behind an instrument panel 25 which conceals them except for the digits exposed through the window indices W1 et seq. The knobs $k1$ et seq. for setting the decade switches and dials are accessible from the front of the panel. In the simple arrangement shown in FIG. 2, two digits are simultaneously exposed in all of the windows W2 et seq. and the operator reads out the upper or lower digits of all of the dials $d2$ et seq., depending upon whether the single digit exposed in the first-decade index window W1 is positive or negative valued as apparent from its radial position and/or color coding. The proper readout for the dial settings shown in FIG. 2 is 0231, which means the calibration for the secondary standard is 231 p.p.m. (parts per million), or 0.0231%, higher than the value of the primary standard.

As an aid to correct readout, each of dials $d2$ et seq. may have associated with it an apertured mask having two positions respectively exposing to view only the inner or outer row of digits. As shown in FIGS. 3 and 4, for example, the mask M2 for the second-decade dial $d2$ may be a plate having a guide slot 26 for embracing the shaft 27 of the second-decade switch S2 in a guide pin 28 for slidably engaging the panel slot 29. These two guide means maintain the masked window 30 in alignment with the panel window W2. The window 30 is dimensioned to expose only one of the two digits which otherwise would be visible through the panel window W2. For manually setting the mask M2 to expose one or the other of the rows of digits on dial $d2$, an actuating knob 31 may be attached to pin 28 as projecting beyond the front face of panel 25. The mask M2 may be held against accidental displacement from either of its selected positions by suitable restraining means providing either a positive lock or frictional restraint. A similar masking arrangement is utilized for each of dials $d3$ et seq. When the readout of dial $d1$ is a positive digit, all of knobs 31 are moved to, or left in, the position shown in FIG. 3 for exposure of only the inner or top row of digits of dials $d2$ et seq.: conversely, when the readout of dial $d1$ is a negative digit, all of the knobs 31 are moved to their other position to expose only the outer or bottom row of digits of dials $d2$ et seq.

Figure 6:
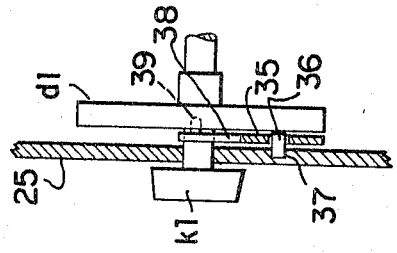
FIG. 6 is a sectional view, in end elevation, of parts shown in FIG. 5.
Figure 5:
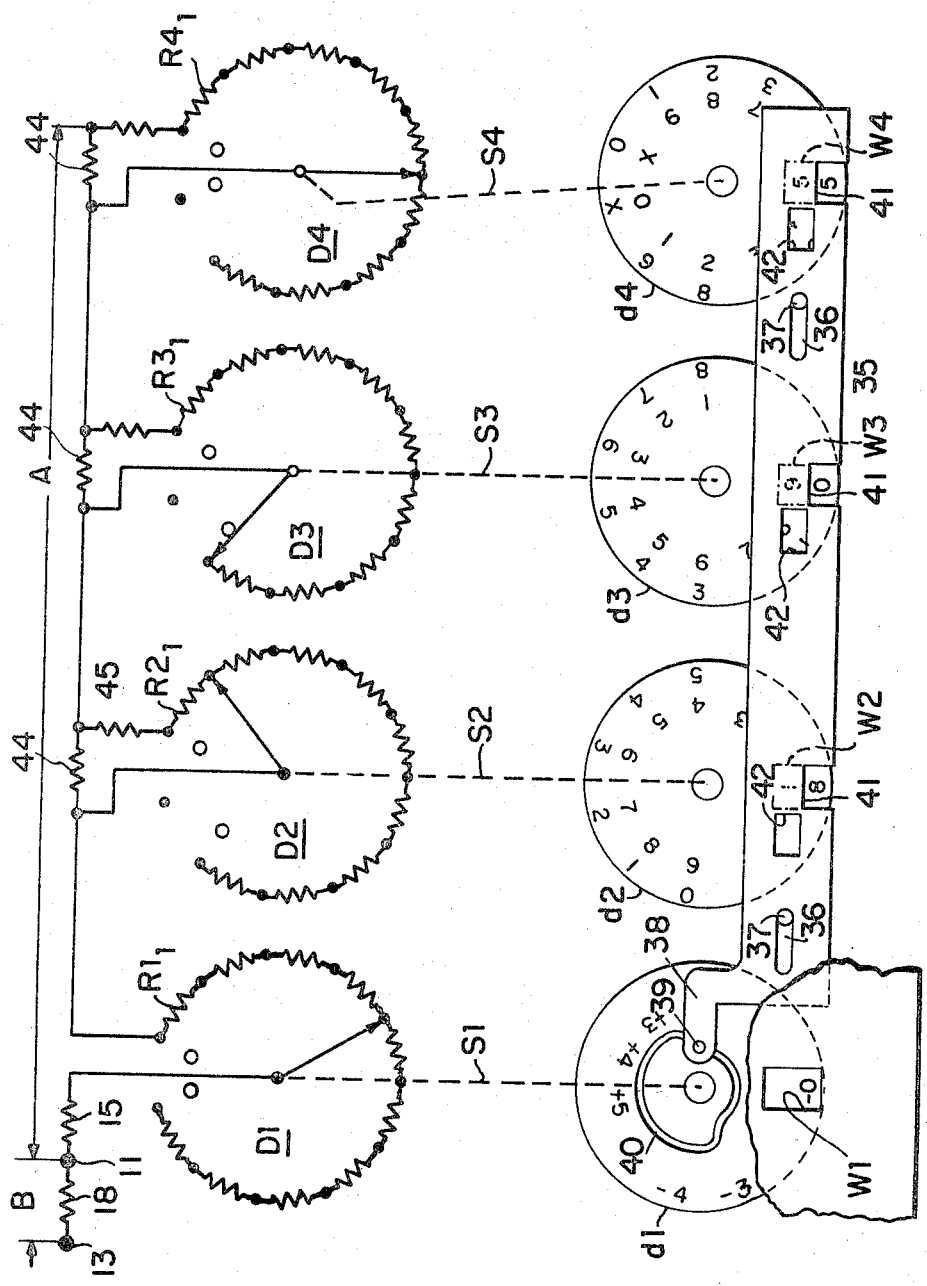
FIG. 5 is similar to FIG. 1 but additionally shows shunted decades and automatic masking means.

To insure proper readout of the decade dials, the masks M2 et seq. may be mechanically coupled to the operating shaft of the first-decade switch S1, so that only the positive digits of dials $d2$ et seq. are exposed to view when a positive digit appears in window W1 of the first-decade dial. A suitable arrangement for automatically setting the masks M2 et seq., in dependence upon the sign of the digits of the first-decade dial, is schematically shown in FIGS. 5 and 6.

The mask 35 is slidably supported behind the panel 25 and in front of at least decade dials $d2$ et seq.: specifically, the mask 35 may have slots 36 for receiving pins 37 projecting from the rear face of panel 25. The extension or arm 38 of the masking slide 35 carries a cam-follower 39 for cooperating with cam 40 attached to or forming part of the first decade dial $d1$ or provided as a separate element on the shaft of switch S1. Specifically, the cam-follower pin 39 is received by a cam-groove 40 having two radii.

For all negative settings of dial $d1$, the cam-follower 39 is in engagement with the smaller of the two cam radii. Consequently, the slide mask 35 is in its left-hand position with its lower row of apertures 41 in position to expose only digits of the lower or outer row of decade dials $d2$ et seq. through the panel windows W2 et seq. When the setting of the first decade dial $d1$ is shifted from —0 to +0, the cam-follower 39 moves along the rise of cam 40 to the larger radii, to automatically move the slide mask 35 to its right-hand position for which its upper row of apertures 42 exposes only digits of the upper or inner row of decade dials $d2$ et seq. It is not necessary that the mask 35 have a pair of apertures 41, 42 for the first decade dial $d1$.

In brief, for all settings of dial $d1$ which expose a negative-valued digit, only negative-valued digits may be read from dials $d2$ et seq.; and, conversely, for all settings of dial $d1$ which expose a positive-valued digit, only positive-valued digits may be read from dials $d2$ et seq.

With the switches of decades D1–D4 respectively set to their No. 5, No. 2, No. 10 and No. 6 positions as shown in FIG. 5, the readout is —0805, directly indicating that the difference between the calibrated and uncalibrated impedances is —0.0805% or —805 parts per million. Assuming balance has been reached for the same setting of decades D2–D4 but with the switch of the decade D1 moved to its No. 6 position, and the slide mask 35 concurrently moved to the next right of the position shown, the readout is +0195, directly indicating that the uncalibrated resistor is 195 p.p.m. (parts per million), or 0.0195%, higher than the calibrated resistor.

Whereas the decades of FIG. 1 are, for simplicity of explanation, shown as of the unshunted type (see Fig. 19, page 19 of NBS Circular 470 and Fig. 36, page 29 of NBS Monograph 39); the second and subsequent decades of FIG. 5 are of the shunted type (Fig. 20 of NBS Circular 470) to minimize the effect of variations of the switch contact resistance. In both cases for direct readout purposes of the present invention, the values of the series-resistance 15 and of the decade resistances R1, R2 et seq. are calculated so that the ratio arms A, B are of equal impedance when the decade dials are all set to their +0 or their —0 positions and so that stepping of the dials respectively effects incremental percentage changes of 0.1%, 0.01%, etc. In calculations for a ratio arm having one or more shunted decades, it is, of course, necessary to take into account the values of the resistors 44, 45 associated with each shunted decade. Table B below gives a specific example when arm A of FIG. 5 is to be adjusted over a fractional percentage range above and below a reference value of 1,000 ohms with a direct readout to four decimal places from the dials $d1$–$d4$.

Table B (for FIG. 5)

| Resistances: | Ohms |
|---|---|
| 15 | 991.0825 |
| R1 (each) | 1.00 |
| 45 (decade D2) | 9.05 |
| 45 (decade D3) | 11.48 |
| 45 (decade D4) | 12.25 |
| 44 (decade D2) | 3.55 |
| 44 (decade D3) | 1.1225 |
| 44 (decade D4) | 0.355 |
| $R2_1, R3_1, R4_1$ (each) | 1.00 |
| $R2_2, R3_2, R4_2$ (each) | 1.75 |
| $R2_3, R3_3, R4_3$ (each) | 2.25 |
| $R2_4, R3_4, R4_4$ (each) | 3.00 |
| $R2_5, R3_5, R4_5$ (each) | 4.20 |
| $R2_6, R3_6, R4_6$ (each) | 6.3 |
| $R2_7, R3_7, R4_7$ (each) | 10.5 |
| $R2_8, R3_8, R4_8$ (each) | 21.0 |
| $R2_9, R3_9, R4_9$ (each) | 63.0 |
| $R4_{10}$ | ∞ |
| Decades: | |
| D1 (+0 setting) | 5.00 |
| D2 (+0 setting) | 2.55 |
| D3 (+0 setting) | 1.0225 |
| D4 (+0 setting) | 0.345 |

It is to be understood that ratio arms or ratio settings embodying the invention may also be used in other types of bridges; for example, Mueller bridges and Kelvin bridges. In the latter, two ratio arm sets, such as shown, are used with the corresponding decades of each pair mechanically coupled to a common dial for readout of the dial setting for that pair of decades. It is also to be understood that the invention is applicable to multi-decade impedance sets in general including those of the capacitive and inductive types, as well as the resistive type specifically shown.

What is claimed is:
1. An arrangement for direct readout of the setting of impedance means adjustable step-by-step over a range extending above and below a reference value comprising
    a fixed impedance and at least two decade impedance means in circuit therewith, the effective impedance of the combination equaling said reference value when the first of said decade impedance means is set at a chosen intermediate value and each of the other decade impedance means is set at its minimum value,
    dial means for readout of the setting of said first decade impedance means and having two series of successive digits each beginning with a 0; the 0 of its first series of digits corresponding with said intermediate value and the subsequent digits respectively corresponding with positive increments of resistance; the 0 of its second series of digits corresponding with the impedance value next below said intermediate value and the subsequent digits respectively corresponding with negative increments of impedance; and
    dial means for readout of the setting of each of the other decade impedance means and having two series of digits each beginning with a 0; the 0 of its first series of digits corresponding with the minimum impedance setting of the associated decade and the subsequent digits respectively corresponding with positive increments of impedance; the 0 of its second series of digits corresponding with the maximum impedance setting and the subsequent digits respectively corresponding with negative increments of impedance.

2. An arrangement as in claim 1 additionally including masking means associated with the second-named dial means and operable to expose only digits of the first series when the readout of the first-named dial means is a digit of the first series and to expose only digits of the second series when the readout of the first-named dial means is a digit of the second series.

3. An arrangement as in claim 2 additionally including means coupling said masking means to the first-named dial means to insure proper readout of all dials.

4. An arrangement as in claim 1 in which the first series of digits of all dial means has a similar characteristic, such as color, background color, or + marking, distinguishing from the second series of digits of all dial means.

5. An arrangement as in claim 1 in which
the incremental steps of the first decade are each 0.1% of said reference value and the associated dial means is marked for multiplication of its readout by 1,000 parts per million and/or 0.1%.
the incremental steps of the second decade being each 0.01% of said reference value and the associated dial means being marked for multiplication of its readout by 100 parts per million and/or 0.01%,
the incremental steps of any third decade being each 0.001% of said reference value and the associated dial means being marked for multiplication of its readout by 10 parts per million and/or 0.001%, and
the incremental steps of any fourth decade being each 0.0001% of said reference value and the associated dial means being marked for multiplication of its readout by 1 part per million and/or 0.0001%.

6. A direct-reading ratio-set for forming two arms of a balanceable bridge circuit and including
a fixed resistance for forming one of said bridge arms, the other of said bridge arms comprising in series a fixed resistance and at least two decade resistances adjustable step-by-step, the effective resistance of said other arm equaling the resistance of said one of said arms when the first of said decade resistances is set at a preselected intermediate value and each of the other of the decade resistances is set at its minimum value,
dial means for indicating the setting of said first decade resistance and having two series of successive digits each beginning with a 0; the 0 of its first series of digits corresponding with said preselected intermediate value and the subsequent digits respectively corresponding with positive increments of resistance; the 0 of its second series of digits corresponding with the resistance value next below said intermediate value and the subsequent digits respectively corresponding with negative increments of resistance; and
dial means for indicating the setting of each of the other decade resistances and having two series of digits each beginning with a 0; the 0 of its first series of digits corresponding with the minimum resistance setting of the associated decade and the subsequent digits respectively corresponding with positive increments of resistance; the 0 of its second series of digits corresponding with the maximum resistance setting and the subsequent digits respectively corresponding with negative increments of resistance.

7. A direct-reading ratio-set as in claim 1 additionally including
masking means for each of the second-named dial means operable to expose only digits of said first series thereof when the readout of the first-named dial means is a digit of the first series and to expose only digits of said second series when the readout of the first-named dial means is a digit of the second series.

8. A direct-reading ratio-set as in claim 7 additionally including
means coupling the first-named dial means to said masking means automatically to shift the position thereof with respect to said second-named dial means as the setting of said first-named dial means is changed from +0 to −0 and vice versa.

9. A direct-readout dial arrangement for a multi-decade impedance set comprising
a plurality of dials each adjustable step-by-step to positions corresponding with the setting of the corresponding decade impedance,
the dial for the highest-order decade having thereon a first and second series of successive digits each series beginning with a 0, with the two 0's in positions respectively corresponding with two adjacent intermediate settings of said highest-order decade, with the subsequent digits of the first series increasing in direction corresponding with positive increments of impedance and with the subsequent digits of the second series increasing in direction corresponding with negative increments of impedance, and
the dial for each of the remaining decades having thereon a first series of successive digits begining with a 0 which corresponds with the minimum impedance setting of the decade, and a second series of digits beginning with a 0 with corresponds with the maximum impedance setting of the decade.

10. An arrangement as in claim 9 additionally including
masking means associated with at least the dials for the decades other than the highest-order decade and operable to expose only digits of the first series when the readout for the dial of the highest order decade is a digit of its first series and to expose only digits of the second series when the readout for the dial of the highest-order decade is a digit of its second series.

11. An arrangement as in claim 10 additionally including
means coupling the dial of the highest-order decade to said masking means to insure proper readout of all dials.

References Cited
UNITED STATES PATENTS

| | | | |
|---|---|---|---|
| 2,777,925 | 1/1957 | Stolz | 338—196 X |
| 2,995,105 | 8/1961 | Maltby | 116—124 |
| 3,198,923 | 8/1965 | Tripp | 116—133 |

RUDOLPH V. ROLINEC, *Primary Examiner.*

E. E. KUBASIEWICZ, *Assistant Examiner.*

U.S. Cl. X.R.

116—133; 338—196